(12) United States Patent
Stirling

(10) Patent No.: US 6,343,331 B1
(45) Date of Patent: Jan. 29, 2002

(54) LOCAL COMMUNICATION SYSTEM AND APPARATUS FOR USE THEREIN

(75) Inventor: Andrew J Stirling, Epsom Downs (GB)

(73) Assignee: Communication & Control Electronics Limited, Surrey (GB)

( * ) Notice: Subject to any disclaimer, the term of this patent is extended or adjusted under 35 U.S.C. 154(b) by 0 days.

(21) Appl. No.: 09/518,934

(22) Filed: Mar. 3, 2000

Related U.S. Application Data

(63) Continuation of application No. PCT/GB98/02673, filed on Sep. 4, 1998.

(30) Foreign Application Priority Data

Sep. 4, 1997 (GB) .............................................. 9718722

(51) Int. Cl.⁷ .......................................... G06F 13/200
(52) U.S. Cl. .................................................... 709/251
(58) Field of Search ................................. 709/200, 251; 370/222, 223, 224

(56) References Cited

U.S. PATENT DOCUMENTS

| | | | | |
|---|---|---|---|---|
| 3,564,145 A | * | 2/1971 | Deutsch et al. | 370/216 |
| 3,943,283 A | * | 3/1976 | Caragliano et al. | 370/293 |
| 4,354,229 A | | 10/1982 | Davis et al. | 710/104 |
| 4,472,711 A | * | 9/1984 | Stollberger et al. | 370/516 |
| 4,498,082 A | * | 2/1985 | Aldridge et al. | 370/248 |
| 4,855,993 A | * | 8/1989 | Hamada et al. | 370/223 |
| 5,390,188 A | * | 2/1995 | Dawson | 714/717 |
| 5,604,729 A | * | 2/1997 | Aoki et al. | 370/224 |
| 5,712,846 A | * | 1/1998 | Yoshinura | 370/226 |

FOREIGN PATENT DOCUMENTS

| | | |
|---|---|---|
| EP | 035789 | 9/1981 |
| EP | 517533 | 12/1992 |

OTHER PUBLICATIONS

Grella G: "Optics is Trumps: Fiber–Optic Connections for Use in Motor Vehicles" Elektronikpraxis, vol. 11, No. 31, Jun. 7, 1996, p. 74 74 XP002075166 see the whole document.

* cited by examiner

*Primary Examiner*—Moustafa M. Meky
(74) *Attorney, Agent, or Firm*—Nixon & Vanderhye P.C.

(57) ABSTRACT

A local communication system includes a plurality of stations exchanging control messages and source data via a ring network. One of the stations is designated a master station with the other stations designated as slave stations. On start-up, a "Set Position" message is generated by the master station and modified by each station in turn, so that each station can determine its ring position. In the event that start-up is unsuccessful due to a break down at some point in the ring, the slave station immediately following the break will become temporary master, and will generate a "Set Position" message prior to shut down. By this mechanism, the master station is able to store an indication of the relative position of the temporary master station in the network, so that the fault may be more easily located.

12 Claims, 7 Drawing Sheets

LOCAL COMMUNICATION SYSTEM AND APPARATUS FOR USE THEREIN

This application is a continuation of PCT/GB98/02673 filed Sep. 4, 1998.

FIELD OF THE INVENTION

The present invention relates to a local communication system comprising a plurality of stations interconnected in a network for the communication of messages, and in particular, to the behaviour of the system upon failure of start-up. The invention further relates to stations for use in such a system, and methods of operation therein.

BACKGROUND ART

A local communication system which combines source data (CD audio, MPEG video, telephone audio etc) with control messages in a low cost fibre network has been proposed in the form of D2B Optical. For details, see for example the "Conan Technology Brochure" and the "Conan IC Data Sheet" available from Communication & Control Electronics Limited, 2 Occam Court, Occam Road, The Surrey Research Park, Guildford, Surrey, GU2 5YQ, United Kingdom (also http://www.candc.co.uk). See also Eurpoean patent applications of Becker GmbH EP-A-0725516 (95P03), EP-A-0725518 (95P04), EP-A-07225515 (95P05), EP-A-0725520 (95P06), EP-A-0725521 (95P07), EP-A-0725522 (95P08), EP-A-0725517 (95P09) and EP-A-0725519 (95P10). "Conan" is a registered trade mark of Communication & Control Electronics Limited. "D2B" is a registered trade mark of Philips Electronics NV.

A problem recognised with any form of communication system is the problem of locating a fault in the network. Many new expensive local area networks comprise bidirectional (dual fibre) links, such that a break at one point does not prevent communication and fault diagnosis in unaffected parts of the network. In a ring network of the type described, made of unidirectional links, such as D2B Optical, however if there is a break in the network at any point, the master station will simply fail to achieve synchronisation, but the location of the fault is not indicated.

To address this problem in a computer network, comprising unidirectional links U.S. Pat. No. 3,564,145 and EP-A-0035789 are proposed mechanisms in which a station immediately following the fault location in the ring can adopt a temporary master status, in order to communicate the fault position to another station. In particular, the temporary master station communicates its unit network address to the master station, where it can be used, to assist in fault diagnosis.

Each of these known mechanism relies on the fact that each station has a unique address or other identifier in the known D2B Optical network, each station can be addressed by ring position or by a function-related device address, as described in our copending application PCT/GB98/00872 (62792WO). However, on start-up, stations are not yet aware of their ring position and their device addresses may not yet have been assigned. Accordingly, the known mechanisms are unable to provide an indication of the fault location for diagnostic purposes in such a system.

SUMMARY OF THE INVENTION

The invention provides a local communication system comprising a plurality of stations, in which one station is designated a master station and the other stations designated as slave stations, the plurality of stations being interconnected by point-to-point links in a ring network for the exchange of data messages, wherein each station is arranged, in a start-up procedure, to recognise a signal received from a preceding station in the ring and to transmit a corresponding signal to a following station in the ring, and wherein, in the event that recognition is not obtained within a predetermined time, a start fault procedure is implemented, the start fault procedure implemented by each station comprising:

configuring each slave station to act as temporary system master, generating its own output signal for recognition by the following station in the ring;

in the event that recognition of a signal from the preceding station in the ring is still not achieved, generating a message indicating a default ring position;

in the event that recognition of a signal from the preceding station is obtained, reverting to slave status, receiving said message and transmitting to the following station a modified message so as to indicate an incremented ring position; recording in at least one designated diagnostic station, an indication of the ring position indicated by a message received by the designated diagnostic station, as an indication of fault position for diagnostic purposes.

The ring position may be recorded for diagnostic purposes by the master station.

In the event that recognition is achieved by all stations around the ring (normal start-up), the same message indicating a default ring position may be generated by the master station, and modified by each slave station to determine that slave station's own ring position. After transmission and modification of said message around the ring, each station may be responsive to messages addressed to it individually by reference to said ring position. Each station may be further responsive to messages addressed to it individually by reference to a logical address. The start-up may be initiated by a signal distributed independently of said point-to-point links.

The network may convey digital audio data together with control messages in a regular frame structure. The stations may generate said signals in synchronism.

The invention further provides apparatus for use as the slave and master stations in a system according to the inventions set forth above.

The invention further provides methods of operation, as set forth above.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

System Overview

The various aspects of the invention will be illustrated, by way of example only, as applied in a D2B Optical network. The general operation of this network will first be described briefly, as background.

Figure 1:
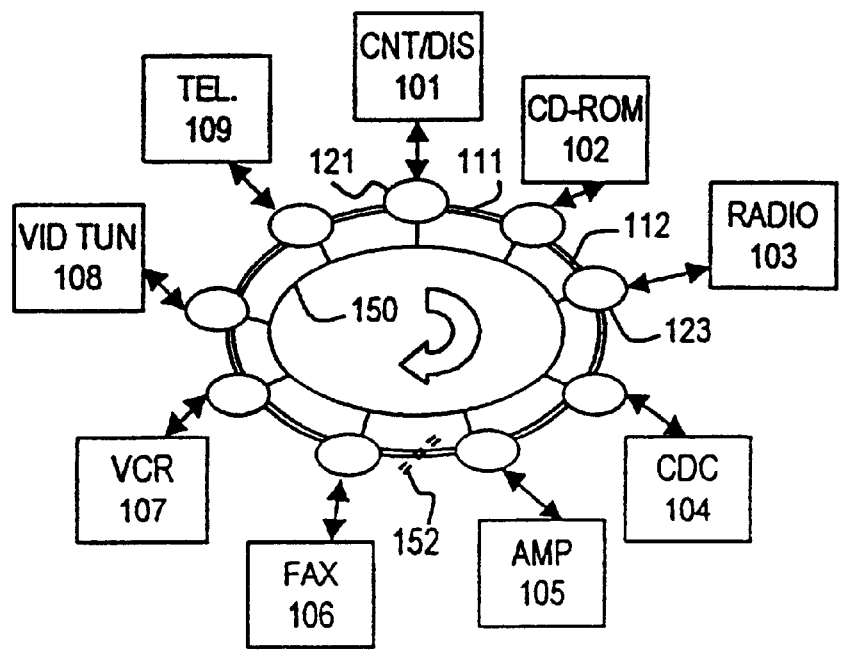
FIG. 1 shows in block schematic form a local communication system embodying the present invention in a ring network.

The system illustrated in FIG. 1 comprises nine audio- or video-related apparatuses 101–109 connected as stations (or nodes) of a Local Area Network (LAN). Of course more or fewer than nine stations may be accommodated. In this example system, the apparatuses are: a control and display unit 101, a Compact Disc memory (CD-ROM) reader 102, a radio turner 103, a CD changer unit 104, an audio power amplifier 105, a facsimile send/receiver unit (FAX) 106, a video recording system (VCR/CAMCORDER) 107, a video tuner 108, and a telephone 109. The display function of the control and display unit 101 may for example provide for display of information read from memory devices by CD-ROM and/or display of video signals from tuner 108 or VCR 107.

The LAN interconnection in the known system comprises nine unidirectional point-to-point fibre optic links 111, 112 etc. linking interface modules 121 etc., each of which is substantially structurally identical, such that the nodes are all connected in a ring. Each fibre optic link carries a combination of digital audio/video signals, CD-ROM data and control messages in accordance with a frame structure to be described in detail below. A designated station (referred to hereinafter as the system master), such as the control/display unit 101, continuously generates the frame structure at a frame sample rate of 20–50 kHz (typically 44.1 kHz as for CD sampling). One station on the network is designated to act as system master on start-up although the role of system master may subsequently be re-allocated to another station, for example in fault conditions as described below.

Figure 2:
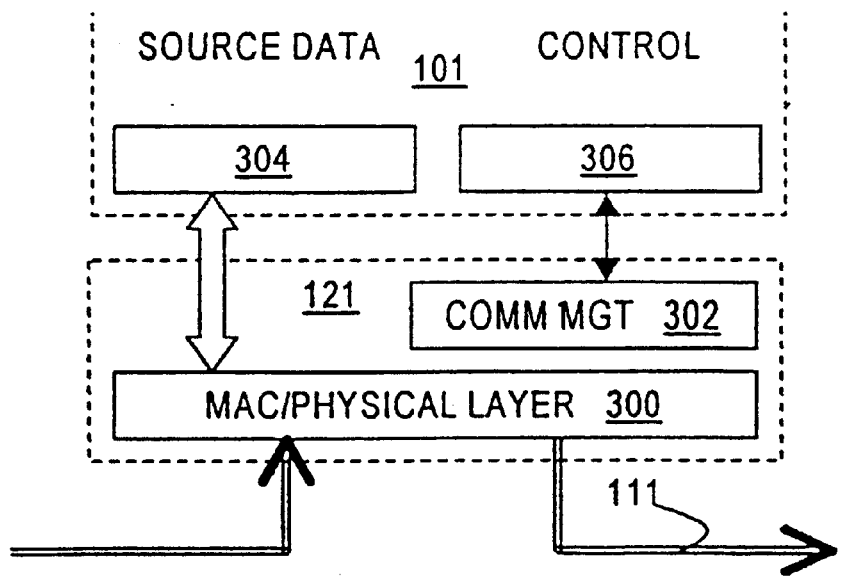
FIG. 2 illustrates the control and source data architecture used in the system of FIG. 1.

The implementation of a station's interface to the fibre optic ring is schematically illustrated in FIG. 2. From the ring 119–111, a media access control (MAC)/physical layer 300 together with a communications management layer 302 for control messages are provided in interface module 121. The communications management layer 302 manages address initialisation and verification and ensures the reliable transport of messages by retransmission according to defined timing rules. Data handling for source data 304 and application protocols for control messages 306 are provided at station level 101, with the application protocols typically defining a device/subdevice grouping and control hierarchy for the station, the format of information exchanged between products, the behaviour of devices/subdevices, and application level timing. It will be readily understood that the interface module 121 may be physically within a station, for example in the form of the Conan integrated circuit or similar network transceiver and associated control software.

Figure 3:
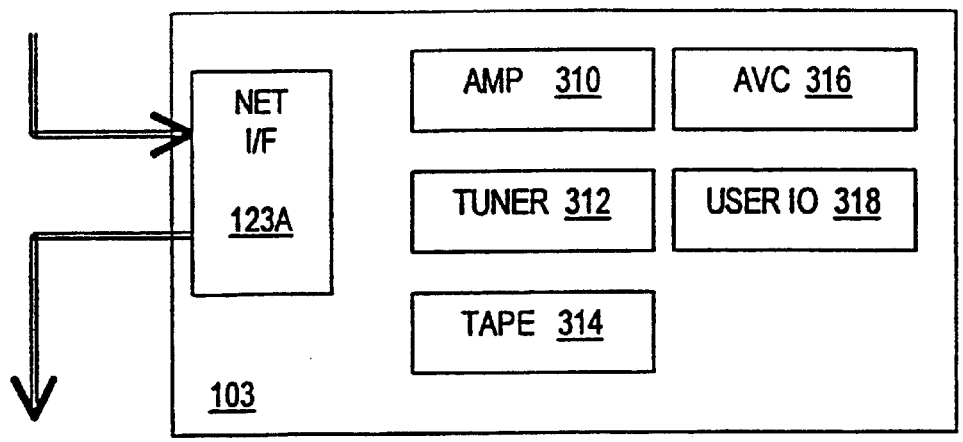
FIG. 3 represents a station with integral interface.

As shown in FIG. 3, a similar the interface module 123 is provided as one function within the radio cassette player 103 which also has amplifier 310, tuner 312, tape playback deck 314, audio/video controller (AVC) 316 and user I/O 318 functions. These functions and their interconnections are not shown and have no direct bearing on the present invention. Their implementation will be readily apparent to those of ordinary skill in the art.

Figure 4:
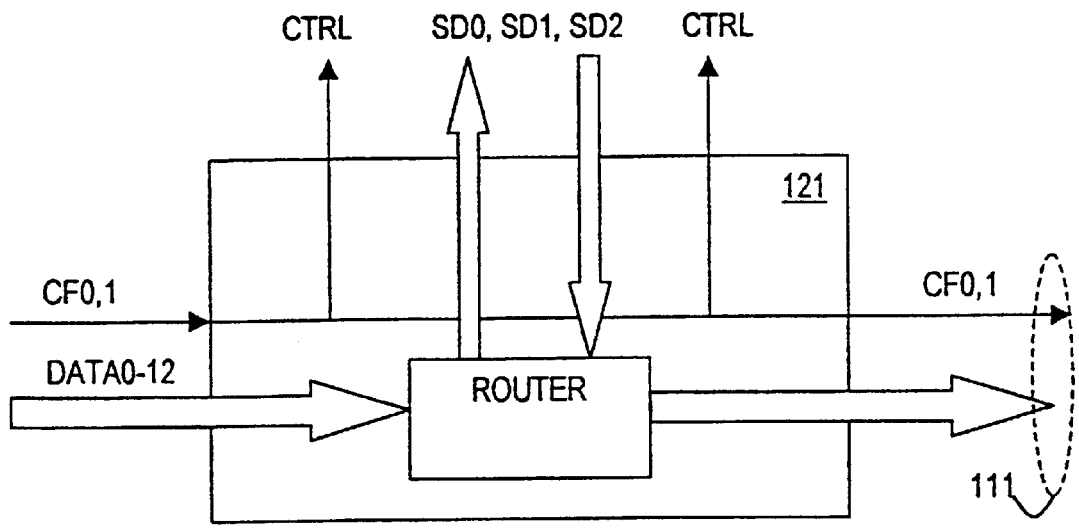
FIG. 4 schematically illustrates one of the interface modules of FIG. 1.

FIG. 4 is a schematic representation of an interface module 121 (in this case node 121) linking a station to the known fibre optic ring. All stations connected to the LAN can generate and/or receive source data (up to three channels SD0–SD2) and control data (CTRL). The control data is of low volume, arrives in burst and is user/event driven (for example user instructions or status changes), whereas the source data is a continuous high volume stream (for example audio, compressed video, CD-ROM data).

In the D2B Optical system, the source data and control messages are transported on the network from node-to-node in frames generated by a station designated as the system Master. Frames are circulated at the same rate as the audio sample frequency, typically fs=44.1 kHz. Frames are grouped into blocks of 48 frames.

Figure 5:
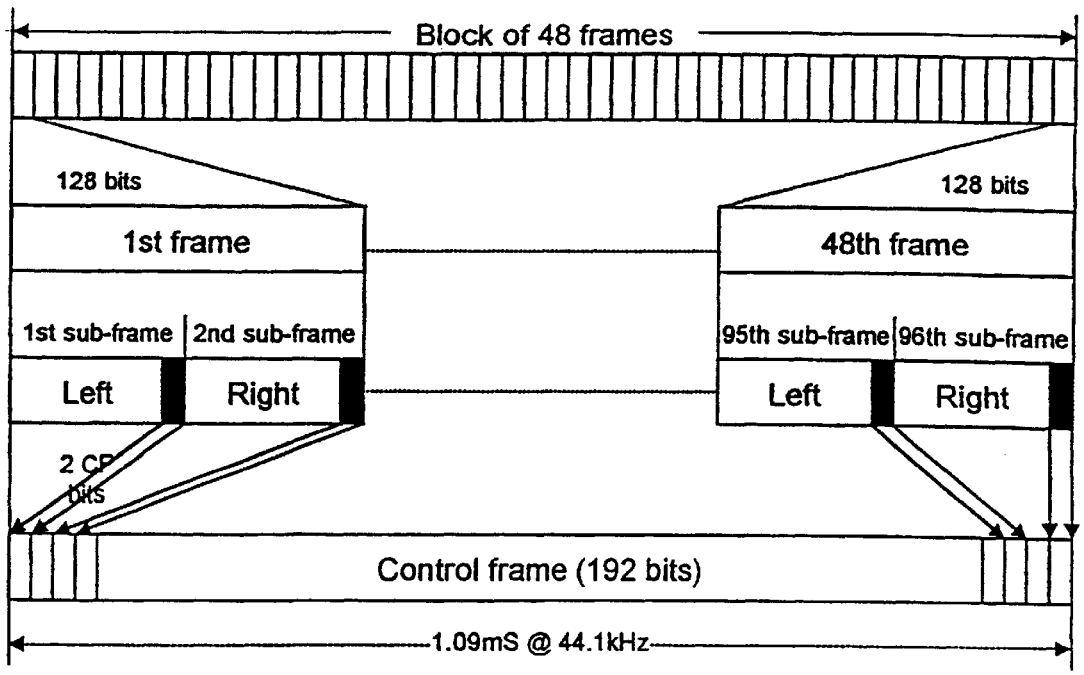
FIG. 5 shows the frame structure of digital signals transmitted according to the known D2B Optical format.

FIG. 5 shows how each network frame is divided into two sub-frames ('left' and 'right'). At fs=44.1 kHz, there will be 88,200 sub-frames per second. The left sub-frame is always the first of the pair transmitted on the network. At the physical level, bits are transported with bi-phase encoding. The relationship between the block, frame, sub-frame and control frame is shown in FIG. 5.

Figure 6:
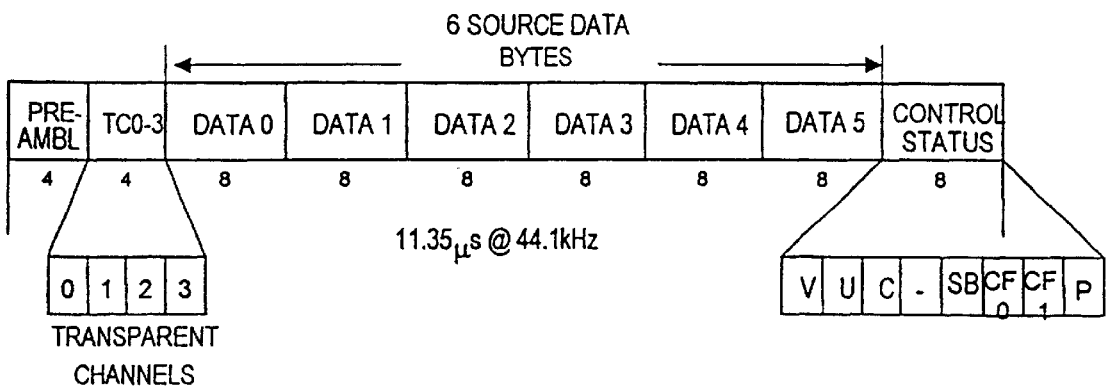
FIG. 6 shows the frame structure of digital signals transmitted between the apparatuses in the system of FIG. 1.

FIG. 6 shows how each sub-frame contains 64 bits, handled within the transceiver as 8 byte fields. The fields comprise the preamble, the transparent channels, 6 bytes of source data, and 8 control/status bits which make up the control frames and the SPDIF status bits. The meaning of the various fields will now be described in detail.

The fields of the sub-frame structure of FIG. 6 are:

Preamble: The preamble synchrorises the network receiver. There are three types of preamble, identical to those defined in the IEC-958 (SPDIF) specification. They contain bi-phase coding violations which the receiver can recognise. The three unique preambles identify left, right and block sub-frames. The left preamble identifies the beginning of a frame and the block preamble identifies the beginning of a block. The block preamble replaces every 48th left preamble. This provides a block structure to which the control frame data is synchronised.

Source Data Bytes: The source data bytes carry the high-volume real-time digital source data. The bytes may be allocated flexibly, so that the devices in a system may use the source data bytes in the most efficient way for that system (see EP-A-0725520 and EP-A-0725521).

Figure 7:
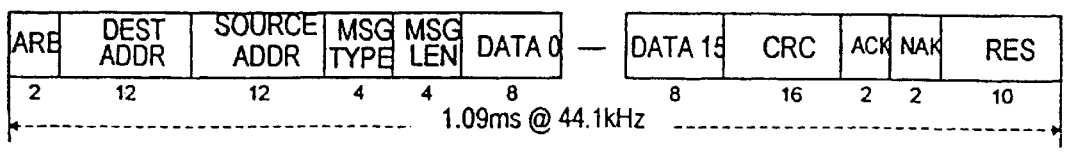
FIG. 7 shows the structure of a control frame carried within the frame structure of FIG. 6.

Control Bits: The control bits CF0 and CF1 carry the control messages (for controlling devices and sending status information). There are 2 CF bits per sub-frame, and a control frame is 192 bits long, therefore 96 sub-frames (48 left+48 right) are required to build-up a complete control frame. The control frame is shown in FIG. 7.

As shown in FIG. 5, the control frame is assembled from and aligned with a block of 96 sub-frames, i.e. the first two bits of a new control frame are taken from the sub-frame with a block preamble, and subsequent pairs of bits are taken from subsequent sub-frames to build up a control frame. The fields of the control frame are:

Arbitration bits: These indicate if the control frame is free or occupied. The transceiver handles these bits automatically.

Destination Address: This is the 12-bit address of the destination of the message, in the range '000'H to 'FFF'H. The sending device writes this into its message transmit buffer for transmission. Certain addresses and address ranges have special meanings, such that stations can be addressed either by ring position or by an application-related 'device address'. Broadcast and 'groupcast' addressing is also provided.

Source Address: This is the 12-bit address of the sender of the message, in the range '000'H to 'FFF'H. The receiving device can read this from its message receive buffer after reception.

Message Type and Length: Two 4-bit fields normally used to indicate the type/length of the message. Message types include commands, status reports and requests for status reports.

Data 0 to 15: The message data. All 16 bytes are always transported. The Message Length normally indicates how many of the 16 bytes are actually valid for the message. The sending device writes this into its message transmit buffer for transmission. The receiving device can read this from its message receive buffer after reception. The message typically comprises an operation code (op-code) and one or more operands.

CRC: A 16-bit Cyclic Redundancy Check value used to verify that the control frame has been transported without error. The CRC is generated by the interface module automatically on message transmission and checked automatically on message reception.

ACK/NAK: Acknowledge and Not Acknowledge (2-bits each) indicate successful message transmission. The use of separate ACK and NAK flags allow reliable point-to-point and broadcast message transport, as described in our application GB-A-2302243. The flags are automatically filled by the destination device(s) (if present) and read by the sending device.

Reserved: 10 bits are reserved for future definition.

Start-up Procedures

The action and configuration of the system at start-up and in particular the procedures followed by the system in the event of a failure to start-up will now be described. It should be noted at this stage that, prior to start-up, nodes do not yet have a unique physical or "node" address. This permits the actual composition of the system changing from time to time.

When the system is powered up the start-up and initialisation procedures of the system are executed by the interface circuit and the application firmware in each station to ensure that there is only one system master, that each station has a unique ring position address, and that each station has or obtains a unique device address for application level communication.

In this embodiment the system can also be "woken" by an electrical wake-up pulse on a wire shown at 150 in FIG. 1, separate from the optical fibre. The master station by sending this pulse "wakes up" all the devices in the system. In certain circumstances the system start-up may be triggered by another device (a slave), which may need to start-up the system to receive an incoming call when the system is shut-down.

Figure 8:
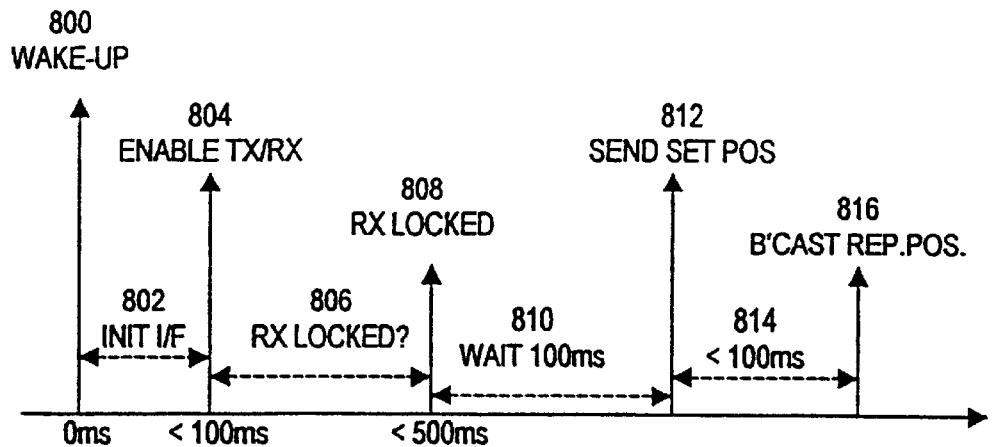
FIG. 8 illustrates on a time line the sequence of events for start-up and general initialisation for the master station in the system.

In FIG. 8, key events are shown on a timescale of milleseconds, running from left to right. Time zero (extreme left) indicates the electrical wake-up event. Time-out periods for each stage ("<100", "<500"), and so forth are indicated in the diagram. Following the wake-up event (800) the system master will:

802: Initialise the interface module, including: Configure the appropriate internal clock source; Set itself to act as master; Disable its electrical by-pass (see EP-A00725517 mentioned above).

804: Enable its optical transmitter output. This action is repeated around the ring until all of the devices have awoken, a fact that the master device recognises when it receives modulated optical light at its own optical input.

806: Wait until lock (synchronism with the optical input) has been achieved (808), and in this the master assumes that all the stations in the system are active.

810: Wait a little while longer to enable the slave stations to achieve lock also.

812: Send a <Set Position> message to the devices in the system. This special message is modified by each station, as described below, so as to allocate unique ring position addresses.

814: Initialise its own device address, which will normally be a constant for the type of devices and the system involved (in this the master acts as an 'installed' device to confirm that its device address is in fact unique—see our co-pending application PCT/GB98/00872 (62792WO), mentioned above.

816: Broadcast a <Report Position> status request message which details the master station's device address and requests every other station to report its ring position and device address. This signal may also be used to indicate to the system that normal message exchange can commence.

Figure 9:
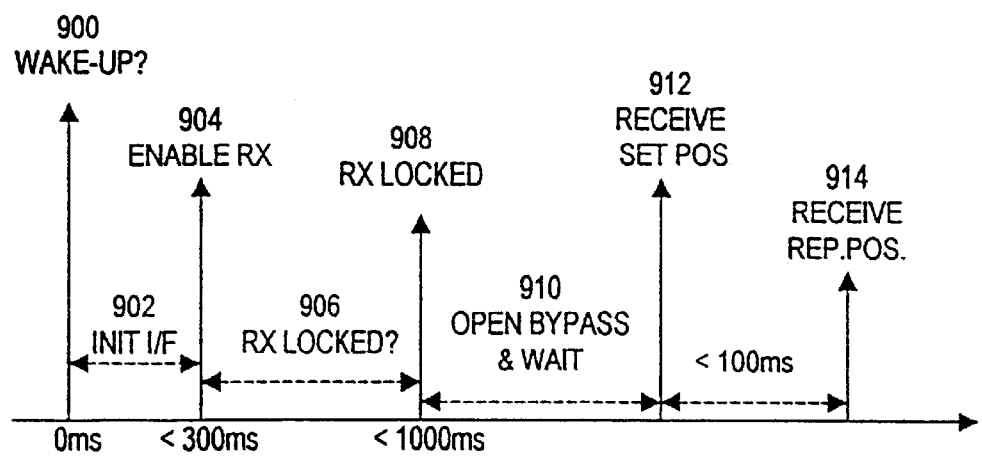
FIG. 9 illustrates on a time line the sequence of events for start-up and general initialisation procedure implemented by each slave station.

In parallel with the above operations of the master station, the slave stations implement their own start-up and general initialisation procedure, as shown in FIG. 9. The wake-up event is again shown at the extreme left (900), with time in milliseconds. Time-out periods are again indicated for each stage. Following receipt of the wake-up pulse (falling edge), each slave station will:

902: Initialise the interface module, including setting the interface module to slave mode and activating (closing) the electrical bypass.

904: Enable its optical receiver input.

906: Wait for locking with the receive optical signal. While the slave is waiting for lock, it continues to monitor the electrical wake-up line to determine whether the original wake-up pulse was valid and to detect whether the master has begun a new wake-up attempt. If a new wake-up pulse is detected during this time, the slave must reset its lock timer to zero milliseconds, and continue to wait for lock. The lock event is indicated at 908. If this has not occurred within the time-out period 1000 milliseconds, then the start fault condition applies (described below).

910: Assuming lock is achieved, open the electrical bypass and wait for the <Report Position> status request.

912: The <Set Position> message is sent by the system master and processed automatically by the slave interface module.

914: The <Report Position> status request message, broadcast by the system master, is received.

In the case where the slave device, for example the facsimile terminal 106, wakes up the system it is configured to operate in the following manner:

Set its interface to master mode, in which the slave will in effect be operating as a temporary master station.

Disable its electrical by-pass.

Enable its optical output and so cause the device next to it to wake up (and so on around the ring until the slave device detects modulated light at its optical input and so detects that it has woken up the master device).

Set to slave mode and await the master device to send a <Report Position> status request message (see below).

The procedure from then on is the same as if the master device itself had triggered the start-up procedure.

Assuming normal completion of the above general initialisation procedure a system master will send a <Report Position> status request message after it has transmitted the <Set Position> message. This requests that each device in the network report its ring position (physical address), and also its logic or "device" address, used for application-level (functional) addressing. If necessary the stations then further co-operate such that new stations can obtain their logical or unique "device" address, in addition to its physical or "node" address. The mechanism for this is discussed in our co-pending application PCT/GB98/00872 (62792WO).

Figure 10:
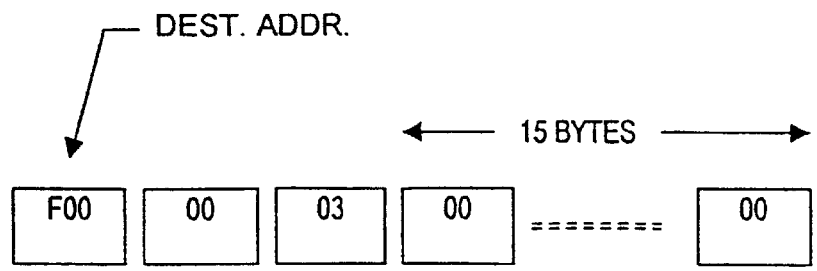
FIG. 10 shows the form of a <Set Position> message in the initialisation of the system of FIG. 1.

FIG. 10 shows the <Set Position> message transmitted during start-up using the control frame structure of FIG. 7. It should be noted that the <Set Position> message is essentially an "empty" one and does not contain sub-device routing, op-code or operands, whilst the message type and length, both set to zero, are both insignificant.

The <Set Position> message is sent (addressed) to a specially reserved address (F00 Hex), ensuring it is recognised automatically by each station's interface module (121 etc). It is then processed by the interface module to derive a node position address unique to each station. In particular, unlike a normal control message, the data bytes of the <Set Position> message are modified by each station as they pass through its interface module. The message initially indicates ring position '0' then '1', then '2' and so on around the ring. The current value is stored by each station as its node address, so that each station obtains a unique node address. This mechanism is described in EP-A-0725516 mentioned above, the contents of which are hereby incorporated herein by reference.

Before receipt of this message, the ring position of any device in the system will be read as zero (000 Hex). In normal operation, however, the system master will be the only device which will retain this '0' value.

The stations which are sent the <Set Position> message will not be informed outside of the interface module, that they are in receipt of the message. Instead, a device can read its interface module's node position register, enabling it to detect if the original default value of 000 Hex has changed.

Start Fault Reporting

If the system's attempt to start-up fails (time-out exceeded at 806), the master will try again a further three times to initiate start-up by generating new wake-up pulses. If the system continues to fail in its attempts to start-up, the Start Fault mechanism newly disclosed herein will come into action. When the failure in the start-up of the system is due to a break or fault at one point in the ring network (as illustrated by broken line 152, FIG. 1), the start fault mechanism within the slave stations makes it possible for the position of the break to be detected. In particular, the station closest to the break will send a fault report to the system master. The <Set Position> message format and mechanism is exploited, and allows the position of the break in the network to be calculated by the master station prior to shutdown.

Figure 11:
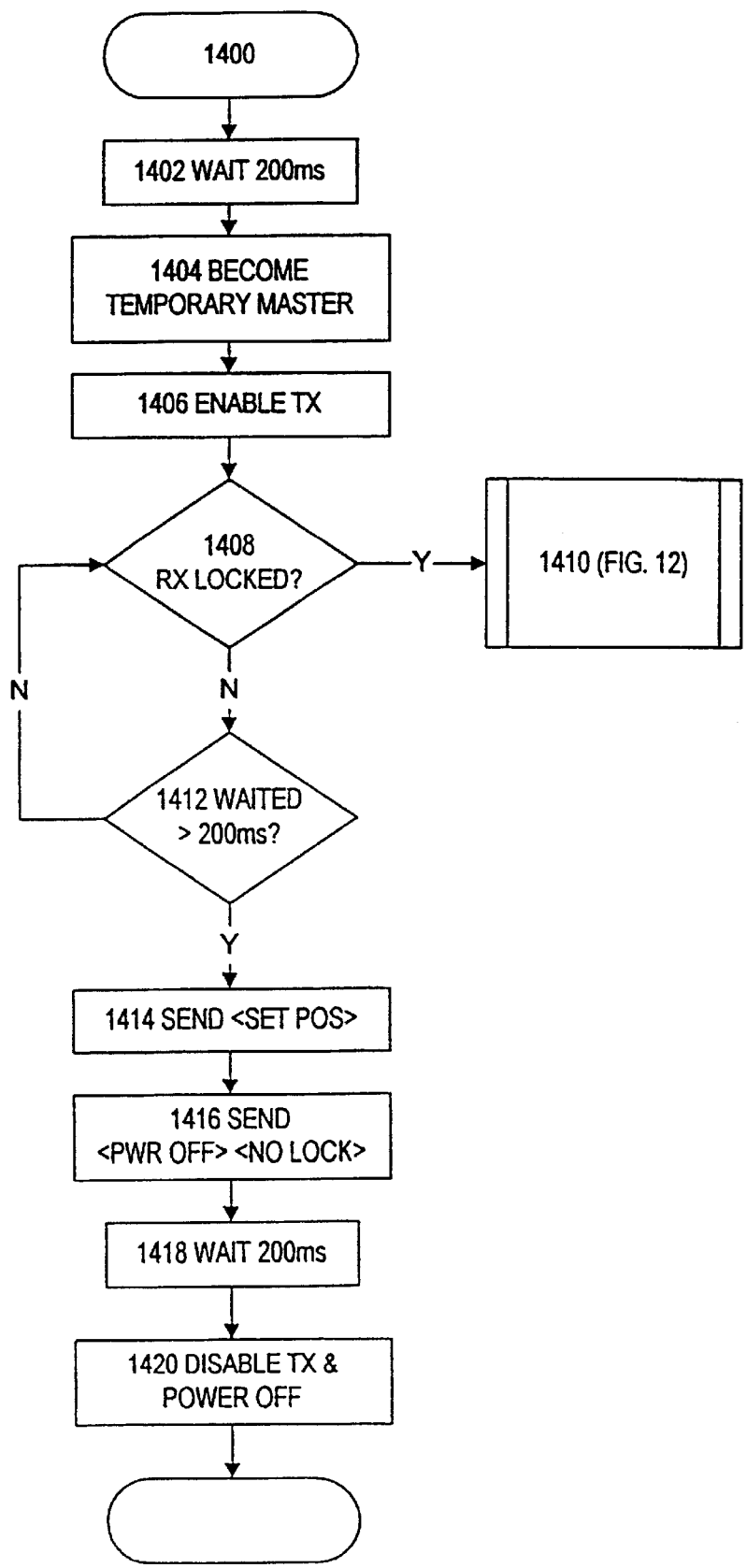
FIG. 11 shows a "start fault" procedure for a slave station.

FIG. 11 shows when the procedure that a slave device follows when a start fault condition is detected (time-out exceeded at 906 above. It is possible for a slave device to become a temporary system master for which purpose each interface module (123 etc) has its own clock generator. This facility is exploited during the Start Fault procedure which begins at step 1400. At 1402, the slave waits before setting its own interface module as master (step 1404). At 1406, that the slave opens its electrical bypass (and starts to generate its own modulated light signal at the optical input). If lock is achieved in the slave device at 1408, meaning that the interface is able to synchronise with modulated light at its optical input, the slave must change back from master to slave mode (step 1410- see FIG. 12). This means that the break in the network is not adjacent to this particular device.

If there is no lock achieved at 1408 and a further time-out of 200 ms has passed (step 1412) the break or fault in the network is apparently immediately prior to this station. In this case, at step 1414, the slave station (or temporary master as it is at this point) generates (1414) a <Set Position> message. This will eventually be received by the system master, having been processed (incremented) by any intervening slave station. At 1416, the slave station (temporary master) then broadcasts a <Power Off> <No Lock>status report message to the system master, then waits (1418) for a time-out to pass, before disabling its output and turning off its power (1420).

Figure 12:
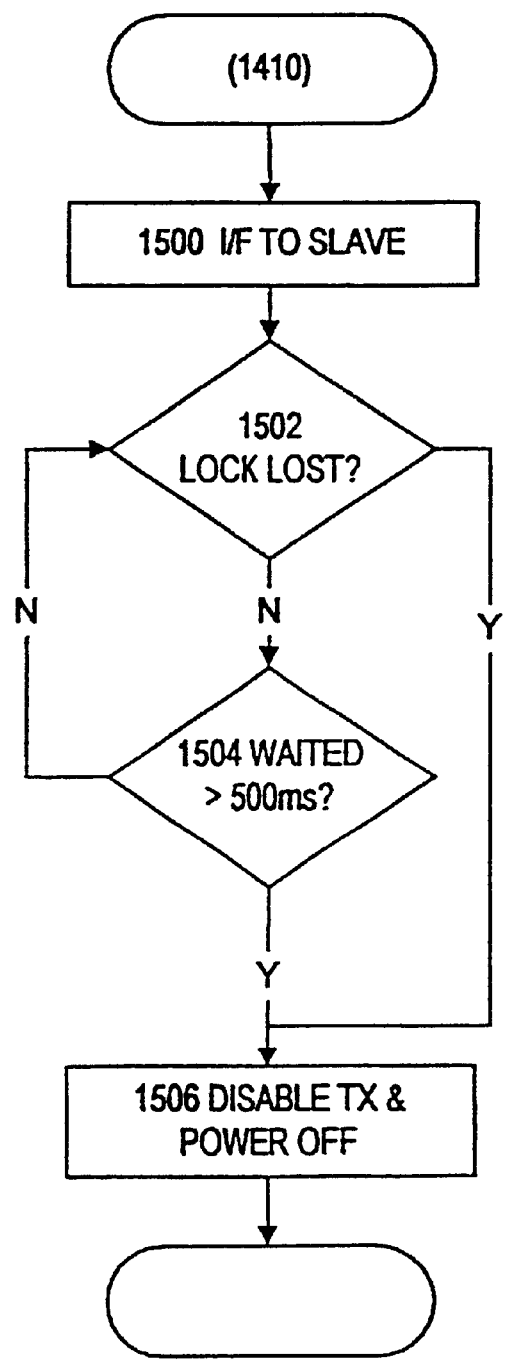
FIG. 12 shows a further part of the slave station "start fault" procedure.

FIG. 12 shows the procedure followed by a slave device in start fault mode, if it should obtain lock. In this case, it may be assumed that the break or fault is not immediately prior to this station in the ring. When each station obtains lock it immediately switches the interface module back to a slave from its previous status as a temporary master, at step 1500. If lock is then subsequently lost (step 1502) then the slave disables its output and power off (1506). However, when lock is not lost, the slave will then wait (at 1504) for 500 ms, before automatically going to step 1506. The reason for this time-out is that the network needs to remain open to allow the reporting slave (ie the station adjacent to the fault) to send the <Set Position> message, and the <Power><Off> <No Lock> status report to the system master (steps 1414–1420).

Figure 13:
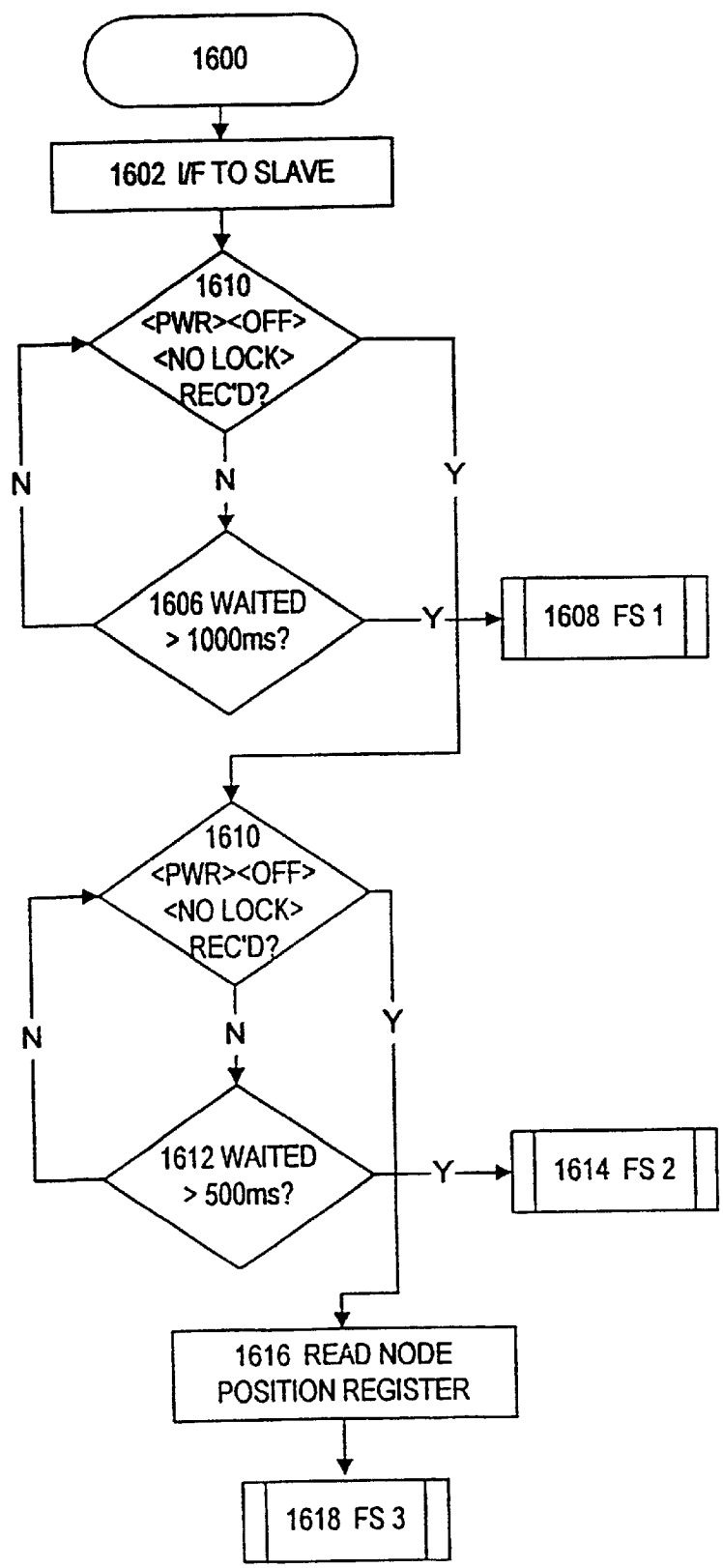
FIG. 13 shows "receive fault report" procedure for the master station.

FIG. 13 shows the procedure followed, beginning at step 1600, when the system master recognises a start fault condition (time-out exceeded at 806). The first thing the master does (1602) is to set its interface module (121) as a slave, as the other devices are now temporary masters. The master then checks (1604) if lock has been obtained. If no lock has been obtained after a set time-out period of one second (1606), the master shuts the system down under a first Fault Shutdown procedure (FS1, 1608). The reason for shutdown at this point (FS1), is likely to be due to be the break in the system being between the last device in the ring and the master. Each fault shutdown procedure FS1, etc leaves a distinctive record that can be recovered for fault diagnosis at a later date.

If lock is achieved at 1604, the master waits at 1610 for a <Power><Off> <No Lock> report to be received from the reporting slave (step 1416, FIG. 11). If no fault report is received within an expected time (1612) the master will shut down the system with a second fault shutdown procedure (FS2, 1614). The lack of a fault report in this case may be due to the master not enabling its buffer, or a fault in the reporting slave has occurred.

When such a fault report is received, however, the master (temporary slave) will read (1616) its own node position register the result of the <Set Position> message generated by the reporting slave. The master will find it is not node zero, but some other value. One can calculate from this value the relative node position of the reporting slave device. The system will then shutdown, (FS3, 1618), with the master having stored the fault type and position information for display or electronic interrogation by an engineer. Given the physical difficulties of accessing and testing each link in the automotive (or domestic) ring network, this information can save a great deal of time, expense and damage in diagnosing and correcting the fault.

As an example of this operation, imagine that the control and display unit 101 (FIG. 1) is defined as the system master, and that a fault has developed in the transmitting FOT of amplifier 105. This effects a breakdown between stations 105 and 106, as shown in FIG. 1. Following the wake-up pulse generated by master station 101, normal start-up begins for all stations. However, only stations 102 to 105 are able to synchronise (lock) with the data stream generated by the master station, due to the fault.

In these circumstances, the control and display unit 101 will attempt twice more to effect start-up by generating a fresh wake-up pulse, with the same result. After the third wake-up pulse, the stations 106 to 109 and 101, will note that lock has not been is received within the time-out period (806 in FIG. 8 or 906 in FIG. 9), and will enter their start fault procedures. Accordingly, each of the slave stations 106 to 109 will set itself as temporary master (1404, FIG. 11), and begin to transmit its own data stream. Master station 101 will set itself as a slave.

Assuming no further faults are present in the ring, stations 107 to 109 will quickly synchronise with the signal generated by station 106, and will revert to slave status (1500, FIG. 12). The nominal system master station 101 will also remain in slave status, awaiting the fault report (1602). After a suitable delay to allow locking, station 106 will generate a <Set Position> message. This will be modified (incremented) by the stations 107 to 109 in turn, and received by the system master. After a further suitable delay, the ring position register of the master station can be read from the interface module 121. Assuming that the node address sequence is simply 0 (master), 1, 2, 3 etc, the node position for station 101 in this example will read 4. An engineer can use this information to count four stations back around the ring, to establish that the break or fault is situated immediately prior to the station 106.

Many variations of the above methods will be apparent to the skilled reader and the above embodiments are presented strictly by way of example only.

While the embodiment described relies on a separate wake-up line 150 to initiate the time-out for start fault detection, other means may be used instead of or in addition to the electrical wake-up line. As one example, time may be measured relative to first application of power to the network, such as when the car battery is first connected. Subsequently, optical wake-up may be used, avoiding the need for the separate line 150. The optical fibres themselves are only one example. Twisted pair or co-axial cables may equally be used as the point-to-point links. One technique for this is described in our co-pending application PCT/GB98/02507 (62795WO).

In the embodiment described, the slave station responsible for becoming temporary master is identified by an arbitration procedure based on the detection of optical input (steps 1408–1492). Alternative mechanisms are possible. For example, rather than relying on ability to lock (synchronise) light input may be detected directly.

In the embodiment described, the <Set Position> message is processed automatically by the interface modules 121 etc, for example, at the hardware or micro code level. This allows an "in-frame" modification to be applied in a synchronous network, but alternatively separate messages could be forwarded. The procedure above may thus be applied in synchronous or asynchronous ring networks. Where processing speed permits, or if a different implementing mechanism is defined, this mechanism may be implemented at a higher level of coding as part of the flow charts in FIGS. 11 and 12. Which mechanisms are implemented by hardware, which by microcode, and which by higher level control programs, is a matter of detailed implementation, determined by various commercial and technical factors familiar to those skilled in the art.

What is claimed is:

1. A local communication system comprising:

a plurality of stations in which one station is designated a master station and the other stations designated as slave stations, the plurality of stations being interconnected by point-to-point links in a ring network for the exchange of data messages, wherein each station is arranged, in a start-up procedure, to recognise a signal received from a preceding station in the ring and to transmit a corresponding signal to a following station in the ring, and wherein, in the event that recognition is not obtained within a predetermined time, a start fault procedure is implemented, the start fault procedure implemented by each station comprising:

configuring each slave station to act as temporary system master, generating its own output signal for recognition by the following station in the ring;

in the event that recognition of a signal from the preceding station in the ring is still not achieved, generating a position message indicating a default ring position;

in the event that recognition of a signal from the preceding station is obtained, reverting to slave status, receiving said position message and transmitting to the following station a modified position message so as to indicate an incremented ring position; recording in at least one designated diagnostic station, an indication of the ring position indicated by a position message received by the designated diagnostic station, as an indication of fault position for diagnostic purposes.

2. A system as in claim 1, wherein the designated diagnostic station is the same as the station designated as the master station.

3. A system as in claim 1, wherein, in the event that recognition is achieved by all stations around the ring in the start-up procedure, the same form of position message indicating a default ring position is generated by the master station, and modified position messages are transmitted by the slave stations so that each slave station can determine its own ring position relative to the master.

4. A system as in claim 3, wherein, after transmission and modification of said position messages around the ring, each station is responsive to data messages addressed to it individually by reference to said ring position.

5. A system as in claim 4, wherein, each station is further responsive to messages addressed to it individually by reference to a logical address.

6. A system as in claim 1 wherein start-up is initiated by a signal distributed independently of said point-to-point links.

7. A system as in claim 6, wherein said point-to-point links comprise optical fibre connections.

8. A system as in claim 1, wherein said recognition includes synchronising network interface circuitry within the slave station to the signal received from the preceding station so that the signals transmitted to the following station are synchronised with the received signals.

9. A system as in claim 8, wherein the position message is modified and retransmitted synchronously with its receipt.

10. A system as in claim 1, wherein said network conveys digital audio data together with control messages in a regular frame structure.

11. An apparatus for use in a local communication system, having the master station technical features of the system as in claim 1.

12. An apparatus for use in a local communication system, having the slave station technical features of the system as in claim 1.

* * * * *